United States Patent Office
2,864,783
Patented Dec. 16, 1958

2,864,783

RESINOUS FILM-FORMING COMPOSITION AND REGENERATED CELLULOSE FILM COATED THEREWITH

Ralph T. K. Cornwell, Rosemont, Pa., assignor to American Viscose Corporation, Philadelphia, Pa., a corporation of Delaware No Drawing. Original application June 7, 1951, Serial No. 230,444, now Patent No. 2,770,555, dated November 13, 1956. Divided and this application April 24, 1956, Serial No. 580,185

11 Claims. (Cl. 260—28.5)

This invention relates to new and useful coating and film-forming compositions containing thermoplastic and organic solvent-soluble resins and to articles coated with the same. More particularly, the invention is concerned with producing coating compositions and coated articles comprising a new and useful organic compound having plasticizing and other properties.

This application is a division of my copending application entitled "Coating and Film-Forming Compositions," Serial No. 230,444, filed June 7, 1951, now Patent No. 2,770,555.

The compositions of the present invention are suitable for application to any type of surface to which a coating may normally be applied and in addition they may also be cast in any known manner to produce self-sustaining, flexible, transparent, moistureproof and heat-sealable films which exhibit highly improved surface characteristics, including excellent surface slip and resistance to caking, sticking or marring during storage. When employed as coating compositions, they may be applied to various sheet materials to produce wrapping tissues which are flexible, heat-sealable and moistureproof and which exhibit highly improved surface characteristics including excellent surface slip and resistance to caking, sticking or marring during storage. A variety of base sheet materials may be used, such as cellulosic materials, paper, albuminous materials (gelatin, agar-agar, casein), or films made from vinyl resins, polyethylene, saran, rubber derivatives, that is, rubber hydrochloride, chlorinated rubber, or the material prepared by reacting rubber and a metal halide such as boron trifluoride, stannous or stannic chloride, stannic acid, and other materials. The compositions are particularly adapted for application to a non-porous, non-fibrous, dense, smooth surfaced, and preferably transparent material such as regenerated cellulose, cellulose ester films including cellulose nitrate and cellulose acetate, or cellulose ether films including ethyl cellulose, benzyl cellulose, glycol cellulose, or lowly etherified cellulose such as those in which there is only one substituent group for several glucose units of cellulose. For purposes of simplicity, the invention will be described as it is applicable to regenerated cellulose film or cellophane, it being understood, of course, that this is intended merely in an illustrative sense.

Various film-forming plastic compositions such as cellulose ester or ether plastics and the like, frequently require a plasticizer or softener to render them less brittle and more easily workable. Plasticizers or softeners are also used in lacquers and varnishes for imparting the desired flexibility to the films formed therefrom. Plasticizers are also employed in moistureproof and heat-sealing coating compositions, for example, thermoplastic nitrocellulose compositions wherein the thermoplasticity is brought about by formulation with thermoplastic resins and plasticizers therefor. These plasticizers are employed in coating compositions to reduce the temperature at which the film ordinarily softens and to render coated sheets free from sticking when stacked in superimposed relation at ordinary temperatures and under pressure. Such coatings, for example, have found application upon films used in packaging foodstuffs and other materials which require moisture-impervious and air-impervious wrappers and coated cellophane of this type has proved quite valuable. However, few plasticizers heretofore available for such heat-sensitive coatings have reduced the softening point of the coating to a low enough temperature without making the coating sticky at room temperature or under 50° C. On the other hand, coatings which do not seal at temperatures between 50° C. and 85° C. are not desirable upon cellophane because of the excessive heat required to fuse the contiguous surfaces.

To overcome the above difficulties various materials have been added to the coating compositions to render coated sheets free from sticking when stacked in superimposed relation at ordinary temperatures and under pressure. However, these materials while reducing the tackiness or sticking qualities of the thermoplastic coatings, detract from the heat-sealing qualities thereof. That is, the strength of the seal is reduced to a commercially impractical point or in some instances the softening point of the coating is not reduced to a satisfactory temperature range, such as indicated above.

It is an object of the present invention to overcome the aforementioned difficulties and disadvantages and provide coating and film-forming compositions which are heat-sealing and moistureproof and in addition, when cast into self-sustaining films or applied to a base sheet as a coating will prevent contiguous sheets in a stack thereof from sticking at ordinary temperatures, under pressure. It is a specific object of the invention to produce anti-sticking, self-sustaining films and coated sheets from compositions containing a material which produces anti-sticking properties and is a plasticizer for the compositions. Other objects and advantages of the present invention will be obvious from the description thereof hereinafter.

The objects of the invention are accomplished by incorporating tricyclohexyl phosphate in thermoplastic film-forming and coating compositions.

Tricyclohexyl phosphate is a white, crystalline solid with a melting point of 62–63° C. and a specific gravity greater than 1.0. It is insoluble in water and soluble in 1,4-dioxane, ethyl acetate, toluene, n-butyl acetate, ethanol, n-butyl alcohol, methanol, acetone, heptane, benzine (B. P. 30–50° C.), carbon tetrachloride, chloroform, cyclohexane, methyl ethyl ketone, and methyl isobutyl ketone. It is only partially saponified by boiling alcoholic sodium hydroxide solution for 24 hours.

Tricyclohexyl phosphate can be prepared by reacting cyclohexanol and phosphorus oxychloride. For example: 3.1 moles of cyclohexanol are dissolved in 1 liter of pure, dry pyridine and the solution cooled to 5° C. With constant stirring, a solution of 1 mole of phosphorus oxychloride in 500 ml. of pure, dry pyridine is added. The rate of addition is controlled so that the reaction temperature never exceeds 7° C. (1.5–2 hours). After standing overnight (approximately 16 hours) at room temperature, the reaction mixture (containing crystals of pyridine hydrochloride) is poured over 4 times its weight of cracked ice. As the ice melts, the pyridine hydrochloride and any unreacted chemicals dissolve in the water and the tricyclohexyl phosphate crystallizes. The product is filtered off, washed thoroughly with water and air dried. The product may be recrystallized from acetone and aqueous acetone if desired.

While tricyclohexyl phosphate may be employed as the only plasticizer in coating and film-forming compositions, it is preferably used in conjunction with other plasticizers such as plasticizers for the film formers employed and also the thermoplastic resinous materials used in the compositions, for example, dibutyl phthalate, dilauryl phthalate, cyclohexyl butyl phthalate, di(methylcyclohexyl) phthalate, di(dimethylcyclohexyl) adipate, dicyclohexyl adipate, phthalimido ethyl propionate, esters of o-benzoyl benzoic acid such as butyl benzoyl benzoate, derivatives of toluene sulfonamide, or the like, p-toluene sulfon ethylamide, etc. While any amount of tricyclohexyl phosphate and other plasticizers may be employed, and in varying combinations or ratios, when making moistureproof and heat-sealing coating and film-forming compositions and particularly compositions to be applied to a base sheet of regenerated cellulose, tricyclohexyl phosphate constitutes 5 to 50% of the composition based on the weight of the total solids. However, when used in combination with other plasticizers, as is preferred, tricyclohexyl phosphate is preferably employed in the range of 5 to 40% and the remaining plasticizer content in the range of 5 to 35%, depending upon the desired properties in the finished film. Various percentage combinations of the plasticizers employed are possible within the ranges given. Where percentages and proportions are referred to throughout the specification and claims, they represent parts by weight of the total solids, unless otherwise indicated.

In the present invention, it is preferred to use a cellulosic film-former in the compositions such as organic solvent-soluble cellulose ethers, for example, ethyl, or benzyl cellulose; cellulose esters such as cellulose nitrate, which is particularly useful; cellulose acetate, and such mixed esters or ether-esters as cellulose acetate-nitrite, cellulose acetate-propionate or ethyl cellulose nitrate. These cellulose derivatives may be of various degrees of conversion, for example, cellulose nitrate of various nitrogen contents. Various resinous film-formers may be used, if desired, such as those film-forming resinous materials referred to hereinafter.

Tricyclohexyl phosphate is compatible with and may be employed in coating and film-forming compositions containing various thermoplastic and thermosetting resins and mixtures thereof and thermoplastic cellulose compounds, for example:

Polyvinyl chloride
Polyvinylidene chloride
Polystyrene
Copolymers of vinyl chloride and vinyl acetate
Copolymers of methyl methacrylate and vinyl chloride
Polyvinyl butyral
Polyvinyl acetal
Polymethyl methacrylate
Polymethyl acrylate
Polyethylene
Polyamides
Natural rubbers
Synthetic rubbers; chlorinated rubber
Polysulfides
Polyisobutylenes, cyclized rubber, rubber hydrochloride
Buna rubber
Coumarone-indene with rubber
Oil-modified and unmodified alkyd resins prepared from dihydroxy alcohols and dicarboxylic acids
Phenol-formaldehyde resins prepared from phenols having only two reactive positions
Cellulose acetate
Cellulose acetate butyrate
Cellulose acetate propionate
Cellulose propionate
Benzyl cellulose
Ethyl cellulose
Butyl cellulose
Urea-formaldehyde
Phenol-formaldehyde (phenols having three reactive positions)
Melamine-formaldehyde
Alkyd resins prepared from polyhydric alcohols and polycarboxylic acids
Phenol-furfural
Unsaturated polyesters
Polyallyl alcohol and derivatives
Protein-formaldehyde resins:
  Casein-formaldehyde
  Shellac-formaldehyde
Polyvinyl chloride and urea-formaldehyde-butanol ether
Polyvinyl chloride and phenol-formaldehyde
Polymethacrylate and urea-formaldehyde
Polystyrene and alkyd
Coumarone-indene and alkyd
Polyvinyl acetal and melamine-formaldehyde The compositions of the instant invention may or may not produce moistureproof coatings and moistureproof self-sustaining films, as desired. When a moistureproof product is desired, however, there may be employed as moistureproofing agents, waxes or wax-like material such as paraffin, petrolatum, ceresin, Japan wax, palm wax, beeswax, certain chlorinated hydrocarbons, Chinese insect wax, or other synthetic waxes or wax-like materials. If some of these waxes are too soft for the purpose desired, they may be mixed with harder waxes of the groups or with carnauba wax, candelilla wax or other harder waxes. Generally, paraffin serves as a satisfactory moistureproofing agent which may be hardened, if necessary, by admixture with carnauba wax or candelilla wax.

It has been found advantageous to include, particularly when employing both a moistureproofing agent and a cellulose derivative, some material which will improve the compatibility of the ingredients contained therein. This material is referred to as a blending agent and is usually of a resinous nature, although this is not absolutely necessary. When the blending agent is resinous, advantage may be taken of its film-forming characteristics, if any, and sufficient quantity may be added to a coating composition to contribute towards the body and build of that composition in addition to the blending action. Depending on the nature of the blending agent, more or less plasticizing action on the cellulose derivative may be obtained.

As the blending agents, any of the natural or synthetic resins commonly available may be used so long as they are compatible and form homogeneous mixtures. Such resins may include ester gum, rosinates, hydrogenated rosin, hydrogenated rosin esters, dammar, copal, kauri, alkyd resins, vinyl derivatives, chlorinated diphenyl resins, and soluble resins of the phenol-formaldehyde type. Non-resinous blending agents may be used when they yield homogeneous mixtures, and these may include hydrogenated castor oil, castor oil phthalate, lanolin or wool grease, ethyl abietate, methyl abietate, diethylene glycol rosinate, diethylene glycol hydrorosinate, or the like.

The compositions of the present invention, when employed as coating compositions, are applied to base materials, such as regenerated cellulose, by means of suitable solvents, for example, toluene, cellosolve, butyl acetate, ethyl acetate, acetone, ethanol, methanol, butyl alcohol, methyl ethyl ketone, heptane, etc. The film-forming ingredients are dissolved to give a coating solution of an appropriate viscosity and solids content. The resultant solution is applied to the desired base by any of the methods known in the art. The solvents are removed and the coated base is subjected to an elevated temperature which, when a wax is employed, is at least equal to the melting point thereof. The coated base is then cooled and a clear, transparent sheet results which is heat-sealable and moistureproof when a wax has been used. By satisfactory adjustment in viscosity and solids content, these same compositions may be formed or cast into self-sustaining films by any of the methods known in the art such as extrusion, casting a film on an endless metal belt, etc.

The film-formers in the compositions of the present invention may be varied from 10 to 80%, wax, or mixtures of the various waxes and the like, hereinbefore mentioned, may be employed in amounts up to 10%, and the blending agent may be used in amounts up to 15%. As previously pointed out, tricyclohexyl phosphate may be varied between 5 and 40% while the other plasticizers employed may be varied between 5 and 35%.

For purposes of illustration, the following examples are given, it being understood that this is not intended in a limitative sense.

*Example I*

Lacquers or coating compositions were prepared employing the following formulations:

|  | Parts | | |
| --- | --- | --- | --- |
|  | 1 | 2 | 3 |
| Nitrocellulose | 48 | 50 | 45 |
| Tricyclohexyl phosphate | 10 | 20 | 25 |
| Phthalimid-ethyl propionate | 20 | 10 | 10 |
| p-Toluene sulfonethylamide | 5 | 5 | 5 |
| Dibutyl phthalate | 3 | 2 |  |
| Maleic acid modified ester gum | 5 | 4 | 10 |
| Run or esterified Copal | 4 | 4 |  |
| Paraffin, M. P. 67° C | 5 | 5 | 5 |

For purposes of easy application, the above compositions were dissolved in solvents employing about 10 parts of the above compositions in about 250 parts of solvent. A suitable solvent mixture is 50 parts butyl acetate, 45 parts toluene and 5 parts ethyl alcohol. Regenerated cellulose film was passed through the solution, the solvent removed, and the coated film dried and cooled. Sheets of the resultant coated film showed no tendency to stick after having been stacked in superimposed relation under pressure for a period of 16 hours at 116° F. The heat seal was excellent and the film showed no tendency to stick to the sealing elements. The moistureproof values varied from 1 to 5, i. e., 1 to 5 gms. of moisture-vapor passed through 1 square meter of film in 24 hours, at 20–30° C., when placed over 10% aqueous NaCl in a chamber containing concentrated $H_2SO_4$. The film showed good flexibility and transparency.

While the present invention has been primarily concerned with the production or formulation of coating and film-forming compositions which are heat-sealing, tricyclohexyl phosphate is also useful as a plasticizer in non-heat sealing compositions. That is, it may be employed in lacquers for coating regenerated cellulose film where a hard and non-sticking surface is desired and where heat-sealing properties are not necessary. The following example shows such a formulation.

*Example II*

| | Parts |
| --- | --- |
| Nitrocellulose | 55 |
| Tricyclohexyl phosphate | 15 |
| Dibutyl phthalate | 5 |
| Modified ester gum, run Copal or dewaxed Damar | 20 |
| Paraffin | 5 |

The following example shows a suitable composition for forming self-sustaining films in which only tricyclohexyl phosphate is employed as a plasticizer.

*Example III*

A composition was prepared containing the following ingredients:

| | Parts |
| --- | --- |
| Nitrocellulose | 14 |
| Urea-formaldehyde resin | 67 |
| Tricyclohexyl phosphate | 18 |
| Hardening substance such as $NH_4Cl$ | 1 |

The above composition was made up into a solution in organic solvents containing approximately 20% solids. The solution was spread in the form of a film on a continuously moving endless metal belt and passed through a chamber at approximately 90° C. wherein the solvents were evaporated and the resin condensed to an insoluble state. The hardened, self-sustaining film was removed from the belt and wound in the form of a roll. The film was flexible and transparent and exhibited excellent resistance to being wet with water after having been immersed therein for a long period of time.

*Example IV*

A composition was prepared employing the following formulation:

| | Parts |
| --- | --- |
| Copolymer of vinyl chloride and vinyl acetate (mol. wt. approximately 10,000) | 65 |
| Tricyclohexyl phosphate | 35 |

These materials were dissolved in acetone to give a 5 to 10% solution. This solution may be applied to form a coating on various surfaces in the usual manner, which exhibits excellent corrosion-inhibiting properties which makes it useful as a coating for the exterior or interior of various reaction vessels, and the like.

Many other and various advantages of the present invention, in addition to those already pointed out hereinbefore, will be apparent to those skilled in the art. For example, it is apparent from the foregoing description that tricyclohexyl phosphate has wide application as a plasticizer in the coating and film-forming art.

It is to be understood that changes and variations may be made without departing from the spirit and scope of the invention as defined in the appended claims.

I claim:

1. A regenerated cellulose film having a coating on the surface thereof comprising a thermoplastic and organic solvent-soluble synthetic resin and tricyclohexyl phosphate, the coating being transparent and heat-sealable and having a high surface slip and a high resistance to sticking.

2. A regenerated cellulose film having a coating as defined in claim 1 wherein the resin is polyvinyl chloride.

3. A regenerated cellulose film having a coating on the surface thereof comprising a thermoplastic and organic solvent-soluble synthetic resin and a mixture of plasticizers comprising tricyclohexyl phosphate, the tricyclohexyl phosphate constituting from about 5% to 10% by weight of the coating, the coating being transparent and heat-sealable and having a high surface slip and a high resistance to sticking.

4. A regenerated cellulose film having a coating on the surface thereof comprising a thermoplastic and organic solvent-soluble synthetic resin, a mixture of plasticizers comprising tricyclohexyl phosphate, wax and a blending agent for the resin and wax, the coating being transparent, heat-sealable and moistureproof and having a high surface slip and a high resistance to sticking.

5. A regenerated cellulose film having a coating as defined in claim 4 wherein the resin a polyvinyl chloride.

6. A heat-sealable, moistureproofing coating composition comprising, by weight, 10% to 80% of a thermoplastic and organic solvent-soluble synthetic resin, 10% to 75% of a mixture of plasticizers comprising 5% to 40% of tricyclohexyl phosphate and 5% to 35% of other plasticizing material, wax and a blending agent for the resin and wax, the coating composition in the form of a film having a high surface slip and a high resistance to sticking.

7. A coating composition as defined in claim 6 wherein the resin is polyvinyl chloride.

8. A coating composition as defined in claim 6 wherein the resin is a copolymer of vinyl chloride and vinyl acetate.

9. A heat-sealable, moistureproofing coating composition comprising, by weight, 10% to 80% of a thermoplastic and organic solvent-soluble synthetic resin, 10% to 75% of a mixture of plasticizers comprising 5% to 40% of tricyclohexyl phosphate and 5% to 35% of other plasticizing material, wax in an amount up to 10% and a blending agent in an amount up to 15% for the resin and wax, the coating composition in the form of a film having a high surface slip and a high resistance to sticking.

10. A coating composition as defined in claim 9 wherein the resin is polyvinyl chloride.

11. A coating composition as defined in claim 9 wherein the resin is a copolymer of vinyl chloride and vinyl acetate.

References Cited in the file of this patent
UNITED STATES PATENTS
2,770,555   Cornwell _____ Nov. 13, 1956

OTHER REFERENCES

Richardson et al.: "Fundamentals of Plastics" (1946), page 18.

Mattiello: "Protective and Decorative Coatings" (1946), vol. 5, pages 2 and 3.

Winding et al.: "Plastics: Theory and Practice" (1947), page 3.

Flory: Principles of Polymer Chemistry, Cornell Univ. Press, New York (1953), page 36.